United States Patent [19]

Holzem et al.

[11] 4,313,465

[45] Feb. 2, 1982

[54] METHOD AND CONTROL DEVICE FOR DOSING FLOW MEDIA

[75] Inventors: Heinz Holzem, Mönchengladbach; Helmut Kehrmann, Kaarst, both of Fed. Rep. of Germany

[73] Assignee: Pierburg Luftfahrtgeräte Union GmbH, Fed. Rep. of Germany

[21] Appl. No.: 959,196

[22] Filed: Nov. 9, 1978

[30] Foreign Application Priority Data

Nov. 19, 1977 [DE] Fed. Rep. of Germany ....... 2751743

[51] Int. Cl.³ .............................................. F16K 31/02
[52] U.S. Cl. .................................... 137/599; 251/129
[58] Field of Search ......................... 137/599; 251/129

[56] References Cited

U.S. PATENT DOCUMENTS

| | | | |
|---|---|---|---|
| 3,081,942 | 3/1963 | McClay | 137/599 X |
| 3,726,296 | 4/1973 | Friedland | 137/599 X |
| 3,874,407 | 4/1975 | Griswold | 251/129 X |
| 3,886,971 | 6/1975 | Lundsgaard | 137/599 |
| 3,942,553 | 3/1976 | Gallatin | 137/599 |
| 4,036,011 | 7/1977 | Gupta | 137/599 X |

*Primary Examiner*—William R. Cline
*Attorney, Agent, or Firm*—Toren, McGeady and Stanger

[57] ABSTRACT

A method and system for providing dosing of fluid is described. The method and system is directed to the control of a plurality of parallel on/off valves which regulate the flow of the fluid. The system includes a plurality of base control valves for delivering a base flow amount. The base control valves are preferably arranged to have binary graduation of their respective flow rates. These base control valves are optionally discontinuously switched on and/or off for delivering the base flow amount. A "timed" valve is varied according to pulse-width modulation techniques to deliver a continuously variable partial flow. The control of the timed valve is effected by electrical circuitry which generates a feedback error signal related to the flow quantity.

14 Claims, 6 Drawing Figures

| Q'$_{NOMINAL}$ IN % | K2 | K3 | K4 | K5 | K6 | K7 | K8 | V4 | V3 | V2 |
|---|---|---|---|---|---|---|---|---|---|---|
| 0 − 12,5 | 0 | 0 | 0 | 0 | 0 | 0 | 0 | 0 | 0 | 0 |
| 12,5 − 25 | 1 | 0 | 0 | 0 | 0 | 0 | 0 | 0 | 0 | 1 |
| 25 − 37,5 | 1 | 1 | 0 | 0 | 0 | 0 | 0 | 0 | 1 | 0 |
| 37,5 − 50 | 1 | 1 | 1 | 0 | 0 | 0 | 0 | 0 | 1 | 1 |
| 50 − 62,5 | 1 | 1 | 1 | 1 | 0 | 0 | 0 | 1 | 0 | 0 |
| 62,5 − 75 | 1 | 1 | 1 | 1 | 1 | 0 | 0 | 1 | 0 | 1 |
| 75 − 87,5 | 1 | 1 | 1 | 1 | 1 | 1 | 0 | 1 | 1 | 0 |
| 87,5 − 100 | 1 | 1 | 1 | 1 | 1 | 1 | 1 | 1 | 1 | 1 |

1 ≙ VALVE IS OPEN OR COMPARATOR INDICATES LOGICALLY ONE

DECODING:

$V4 = K5$ $V3 = K3 \cdot \overline{K5} + K7$ $V2 = K2 \cdot \overline{K3} + K4 \cdot \overline{K5} + K6 \cdot \overline{K7} + K8$

METHOD AND CONTROL DEVICE FOR DOSING FLOW MEDIA

FIELD OF THE INVENTION

The invention relates to a method for dosing flowing media by means of a plurality of on/off valves which are connected in parallel, and to a control device suited for carrying out the method.

BACKGROUND OF THE INVENTION

It is known from the technology of chemical process engineering to connect several on/off valves in parallel for controlling a quantity flow. These valves are either opened or closed depending on the respective nominal amount. In this case, the cross sections of dosing can be graded, for example, according to a binary series $2^n$. With the use of an increasing number n of the valves, the resolution capability is improved. This binary dosing method has certain advantages, that is, the relatively simple design of the valve and the fact that actuation of the valves is not as frequently necessary. Further, there is the possibility that, when one or several valves fail, the redundancy of the remaining valves may be utilized. The method, however, has the disadvantage that, for many purposes, for example, in controlling gas turbines, a very large number of valves is required in order to obtain a sufficiently sensitive dosing. In practice, this large number cannot be realized.

The German Pat. No. 1,919,489 describes a device for dosing fuel for gas turbines, wherein a dosing valve is provided which assumes only two positions, namely, a position for the minimum and a position for the maximum required fuel amount. When the switching frequency remains constant, the time for the position assigned to the maximum required fuel amount is changed according to the desired fuel amount. Moreover, variable stops for the valve tappet are provided in order to be able to adjust a continuous base amount in addition to the pulse width- or duration-modulated amount.

In order to establish the absolute minimum amount, an adjustable throttle is provided parallel to the dosing valve. The absolute maximum amount is limited by means of another throttle which is also adjustable and is connected in series with the pulse duration-modulated valve. The linear allocation between the effective cross section of dosing and the flow is obtained by keeping constant the pressure difference above the cross section of dosing. In some types of applications, such as in the control of gas turbines, it may be necessary to automatically adjust the base amount, and thus the stops, in order to widen the dosing range. Such a possibility does not exist in this known proposal; however, the positioning device to be additionally provided for this purpose as an obvious measure would form a complex electromechanical system which would essentially cancel the advantage of the pulse duration-modulated dosing system, which is very simple by itself. Moreover, due to an insufficient redundancy, the safety factor in this dosing system is extremely low when the valve fails.

SUMMARY OF THE INVENTION

A primary object of the present invention is to provide a method and device of the above-indicated type of system which, while avoiding additional control and regulation measures and devices, is simple and still inherently safe and, at the same time, provides sensitive dosing. This object is achieved in accordance with the invention in that a valve for delivering a continuously adjustable partial flow is controlled in a timed manner, while the remaining valves are optionally discontinuously switched on and/or off for delivering the residual flow formed by the base load portions. With these measures, an extremely safe and sensitive dosing is facilitated in a surprisingly simple manner since, of the plurality of the valves which are connected in parallel and which all only require the possible positions "on" or "off", one is controlled in a pulsating manner and, thus, delivers a continuously variable partial amount. Due to this property, this valve is called "timed valve" hereinafter. The remaining valves, as so-called "base load valves", deliver a coarsely adjusted base amount. Accordingly, with a suitable control, the flow can be changed by means of the timed valve in such a manner that the coarsely adjusted base amount is supplemented, according to the required nominal amount, to form a continuous finely adjustable total amount.

The flow control system in accordance with the invention comprises a plurality of base control on/off valves connected in parallel between the input and output lines of a flowing medium. The valves are subject to on/off control by an electrical signal. Means are included for providing control signals for controlling said base control valves, which means are responsive to a nominal input control signal. A timed valve subject to control by a pulse-width modulated signal is connected parallel to the base control valves between the input and output lines. Also included are means for providing signals which are analogs of the values of flow through each of the valves, summing means for combining the flow-analogous signals to form a signal representing the actual flow through the output line, means for comparing the actual flow signal with the nominal input control signal to form an error signal and means responsive to the error signal for pulse-width modulating the timed valve.

For a better understanding of the present invention, reference is made to the following description and accompanying drawings, while the scope of the invention will be pointed out in the appended claims.

BRIEF DESCRIPTION OF THE DRAWINGS

In the drawings, a preferred embodiment of the dosing method is illustrated for a dosing range of approximately 1:50, wherein.

DESCRIPTION OF THE PREFERRED EMBODIMENTS

Figure 1:
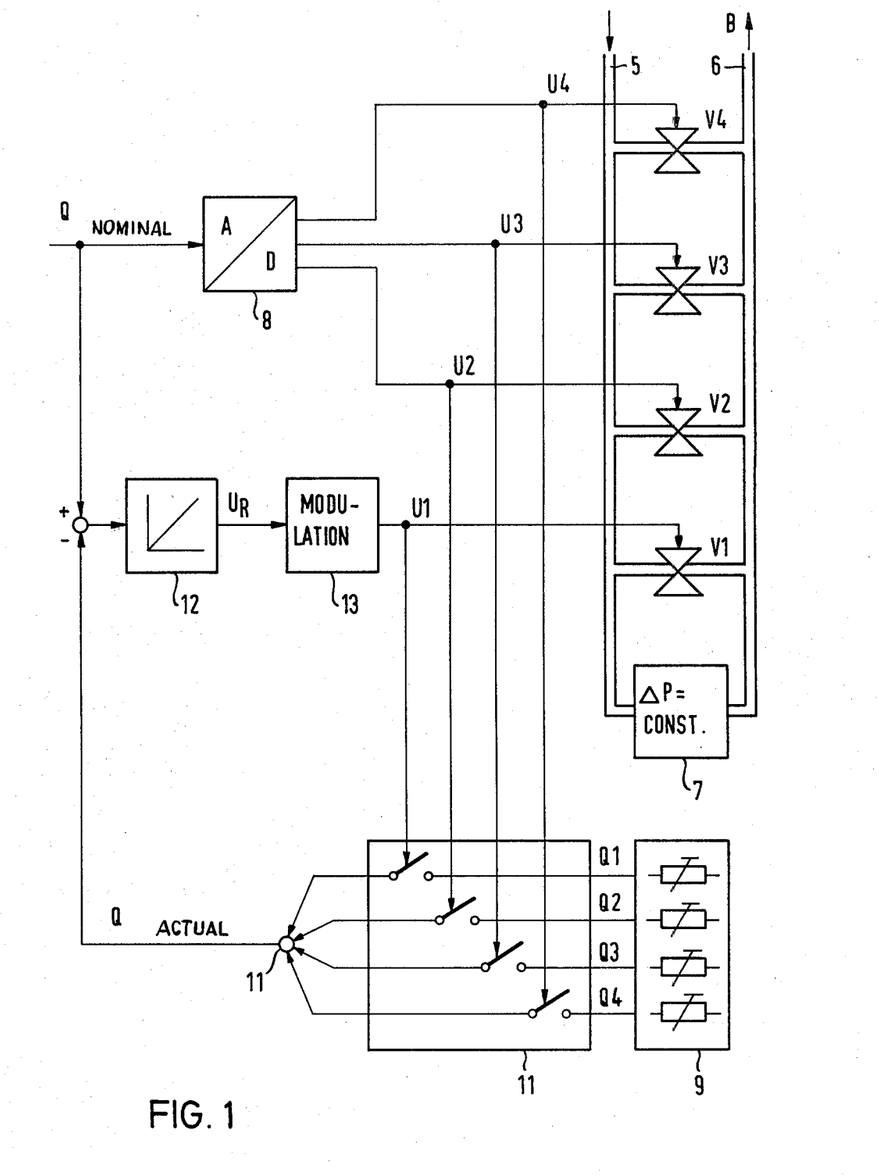
FIG. 1 shows a first inventive control arrangement.

Referring initially to FIG. 1, shown there is the simplified control arrangement of a dosing system with four on/off solenoid valves V1 to V4 which are arranged between the fuel inlet line 5 and the fuel outlet line 6. A pressure regulator 7 of conventional design keeps the differential pressure above the valves constant. The electrical analog signal $Q_{nominal}$ which is given by a higher ranking engine control serves as the nominal value for the fuel flow B.

The binary-coded A/D converter 8 forms the control signals U2, U3, U4 for the valves V2, V3, V4 which add the base amount portions to the fuel flow B and are, therefore, hereinafter called base load valves. By means of four potentiometers, the electrical analog flow values Q1 to Q4 of the individual valves are stored in a calibration device 9. A switch unit 10 switches the calibrated values of the switched-off valves to an actual value summation point 11 in dependence on the control signals Q1 to Q4, so that the signal $Q_{actual}$ represents the electrical analogy of the flow B. In doing so, the finishing tolerances regarding the flow through the valves can be compensated by means of the electrical calibration.

The difference between $Q_{nominal}$ and $Q_{actual}$ acts on an integrating regulator 12 which, in turn, modulates a modulation system 13 which generates the control pulses U1 for the timed valves V1 which can be controlled in a pulsating manner. Accordingly, depending on the nominal value, the base amount portions are switched on and the "remainder" is added through a timed valve to be measured analogously. To realize the integrating regulator 12 and the modulation system 13 the well known circuit design techniques with operational amplifiers such as Motorola MC 1741 may be used.

Consequently, the maximum amount of the timed valve must be at least as large as the smallest base amount in order to be able to continuously adjust the entire dosing range.

The A/D converter must be subject to switching hysteresis in order to prevent an insignificant nominal value waviness from leading to an undesired permanent switching of the base load valves. This hysteresis shall also be used in connection with the emergency operation. Since in the case of three base load valves, only one three-bit-converter is required for which no additional special accuracy requirements are set since shifts in the switching point can be compensated by the analog-dosing timed valve V1, a discrete-constructed A/D converter according to the area decoding principle is such a device in which the hysteresis can be easily realized.

Figure 2:
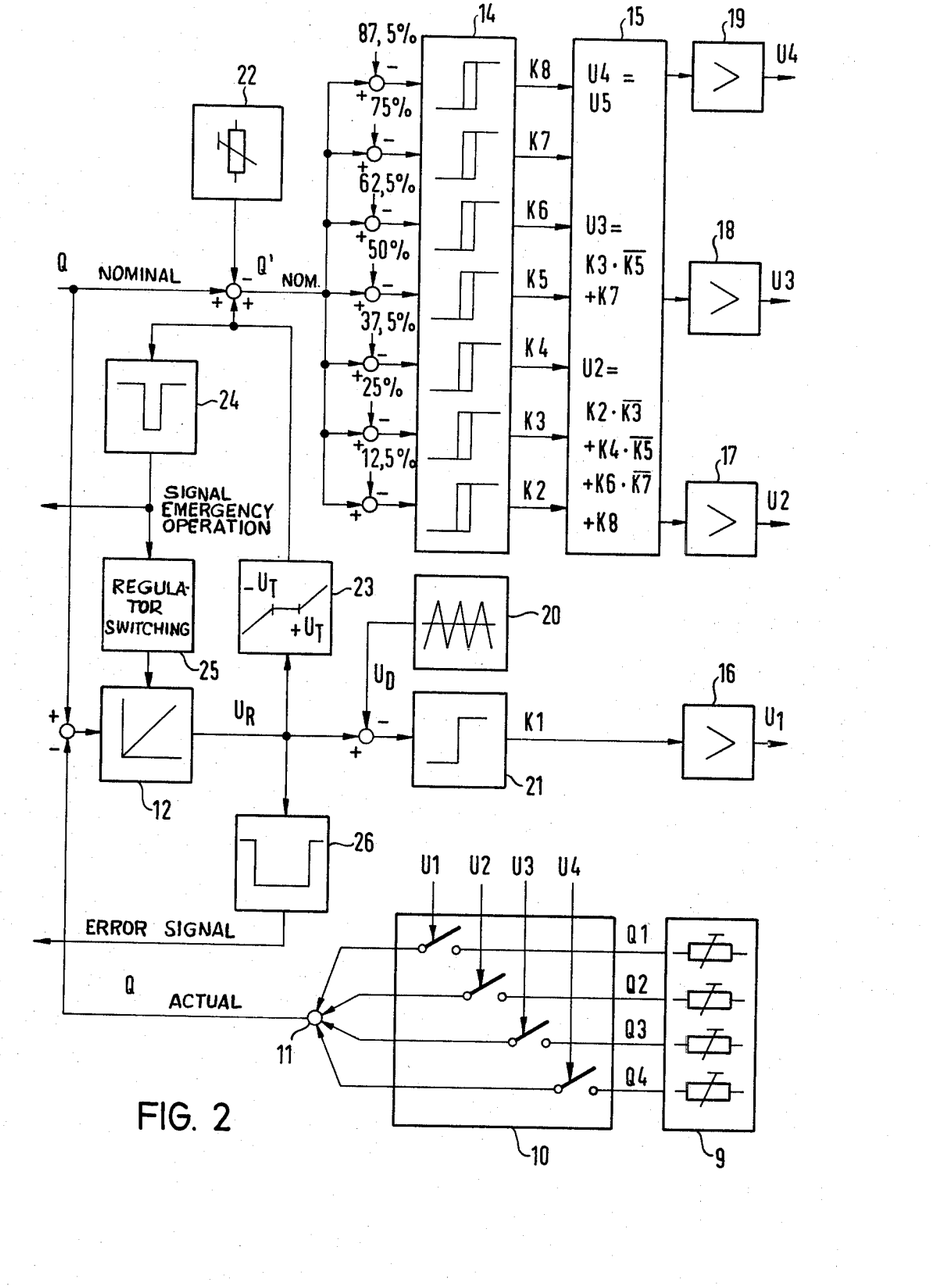
FIG. 2 shows a second detailed control arrangement including an arrangement for emergency operation.

The more detailed control pattern of FIG. 2 illustrates the principle of the A/D converter. The signal $Q'_{nominal}$ derived from the nominal value is supplied to a 7-step area indicator 14 which indicator consists of seven comparator switches with hysteresis. A decoder 15 processes the outputs K2 to K8 of the area indicator and, through the final stages 17, 18, 19 and by means of the signals U2, U3, U4, the magnetic systems of the base load valves V2, V3, V4.

Figure 3:
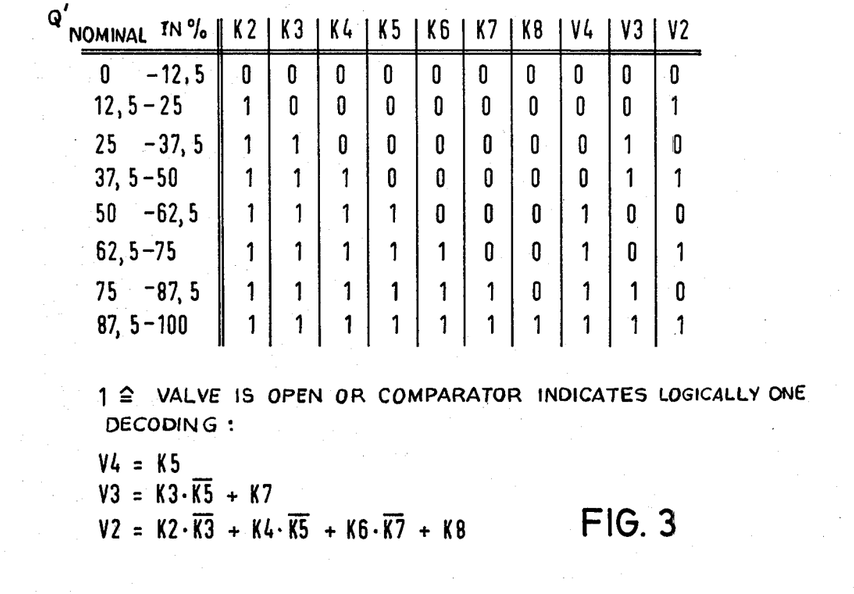
FIG. 3 shows a table of the valve switching positions in dependence on the input value of an analog-to-digital converter (hereinafter called A/D converter) and the corresponding positions of the area or range indicators when a converter according to the area decoding principle is used.

The table according to FIG. 3 explains the decoding and shows the area indicator positions K2 to K8 as well as the switching position of the valves V2 to V4 in dependence on the input value $Q'_{nominal}$ of the A/D converter. For the sake of simplicity, the switching hysteresis is not taken into consideration. From the table of values, the decoding can be determined by means of the known methods of the Boolean algebra.

The answer signals U1 to U4 of FIG. 2 are derived from the current flow through the coils of the solenoid valves. This brings about the advantage that interruptions in the line and defects in the final stages can be recognized immediately. A farther-reaching safety could be obtained by using a hydraulic answer signal, however, this would require some additional measures. For this purpose, to each valve a separate flow meter tracer must be assigned, for example, a hot-wire tracer, whose only purpose it is to determine whether or not there is a flow. However, the electrical answer signal is also required in this case since the hydraulic answer signal, due to its time constants, would slow down the control or would lead to switching surges.

The pulse duration-modulation of the valve V1 is carried out by means of an auxiliary delta voltage $U_D$ of constant frequency and amplitude which is generated by a generator 20. This frequency determines the clock frequency of the valve V1 and is chosen such that the waviness of the fuel flow is sufficiently smoothed by the time constant of the gas turbine engine. The amplitude corresponds to the maximum flow which is to be dosed by the valve V1.

The difference of the output signal $U_R$ of the integrating regulator 12 and the auxiliary delta voltage $U_D$ is delivered to a comparator 21, i.e., the regulator signal $U_R$ is intersected with $U_D$. The resulting pulse sequence K1 controls the valve V1 through the final stage 16 by means of the signal U1.

As already mentioned, the edges of the pulse duration-modulation are to be left out in order to obtain linearity. However, this means that the valve V1 always delivers a certain minimum amount. When V1 is timed, for example, with the period T and when V1 operates linearly up to a pulse duration $T_{min}$, there results the minimum amount $Q_{min}$, the maximum amount $Q_{max}$ and the modulation range g, wherein Q1 is the flow with a permanently opened valve V1.

$$Q_{min} = \frac{T_{min}}{T} \cdot Q1$$

$$Q_{max} = \frac{T - T_{min}}{T} \cdot Q1$$

$$g = \frac{Q_{min}}{Q_{max}} = \frac{T_{min}}{T - T_{min}}$$

$Q_{max}$ must be at least as large as the smallest base amount which, according to FIG. 3, is 12.5%. For the example T=21 ms, $T_{min}$=3 ms there results
g=1:6 $Q_{max}$=12.5% $Q_{min}$=2.1% Q1=14.6%.

Q1 is chosen somewhat larger in practice in order to be able to compensate, owing to the expanded dosing range of V1, the tolerances of the remaining valves as well as the switching hysteresis of the range indicator, for example g=1:6 $Q_{max}$=15% $Q_{min}$=2.5% Q1=17.5%

In order to compensate this minimum amount $Q_{min}$, by means of a potentiometer 22 in FIG. 2, the input value $Q'_{nom}$ of the range indicator 14 is shifted accordingly so that the switching points of the range indicator, as long as no emergency operation takes place, is now at a nominal value of 15%, 27.5%, 40%, etc. instead of 12.5%, 25%, 37.5%, etc.

Figure 4:
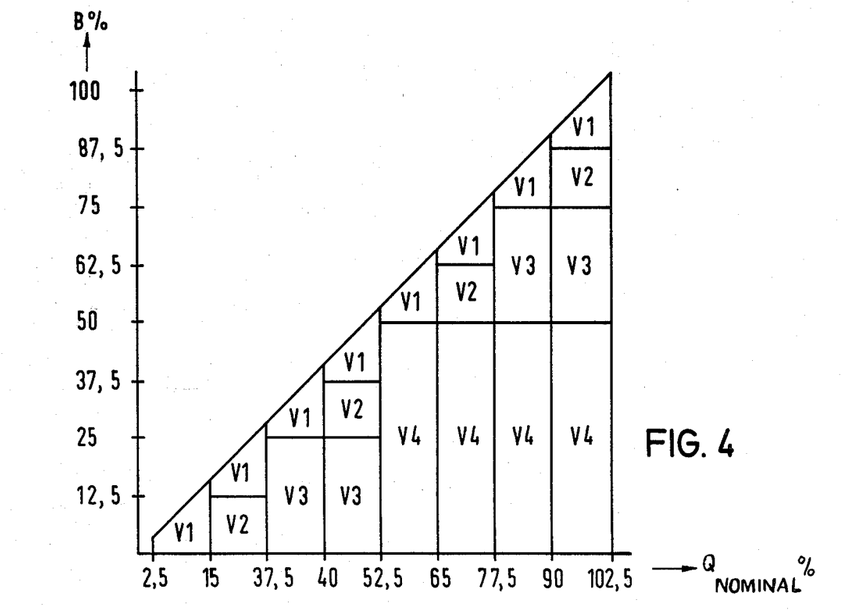
FIG. 4 shows the fuel flow and its distribution over the individual valves in dependence on the nominal value.

FIG. 4 shows, for this example with 2.5% shift, the fuel flow and its distribution over the individual valves in dependence on the nominal value, the switching hysteresis being neglected. In the ranges 0% to 2.5% and 102.5% to 105% there is no longer a linearity, since the pulse widths or pulse gaps of the timed valve V1 become too small. However, this is of no importance in this case since these ranges are not required in the operation.

Figure 5:
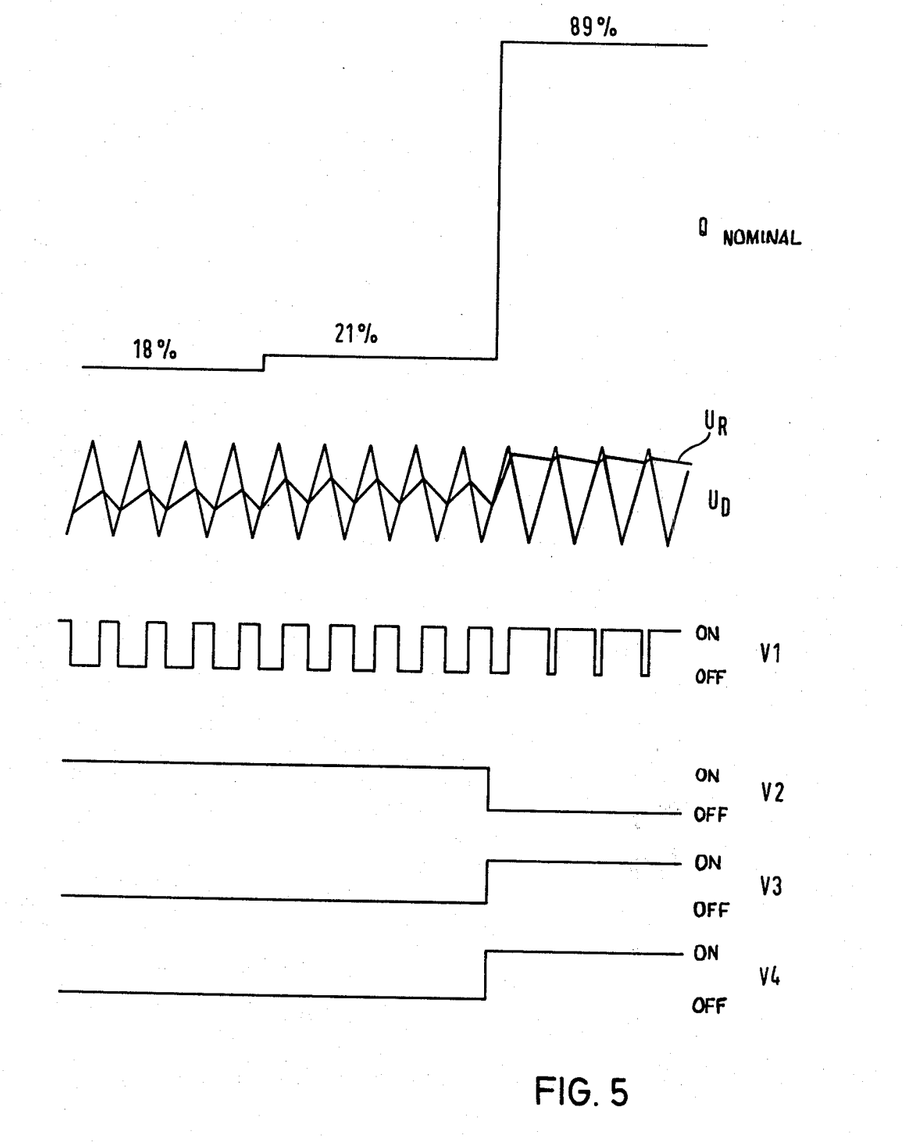
FIG. 5 shows the valve positions and regulator variations in the case of jumps in nominal value.

FIG. 5 shows the valve positions and the variation of the regulator voltage $U_R$ in the case of jumps in the nominal value, wherein the above-mentioned numerical values are assumed for the flows through the valves. In the case of a nominal value $Q_{nom}$ of 18%, 12.5% are dosed by the valve V2. The regulator voltage $U_R$, whose intersections with the auxiliary delta voltage $U_D$ result in the control pulses for the valves V1, is adjusted until the average per time of the flow through V1 corresponds to the remaining 5.5%.

In the case of a small jump in the nominal value to 21%, only the modulation ratio changes, while in the case of a large jump to 89%, the base load valves are also switched.

The magnitude of the integrating speed of the regulator is chosen in such a way that $U_R$ is somewhat flatter than $U_D$, since otherwise there would be several intersections within one period and, thus, undesired intermediate timings would occur. Consequently, with the regulator adjusted in this manner, it is possible to adjust any desired flow value within a period.

Figure 6:
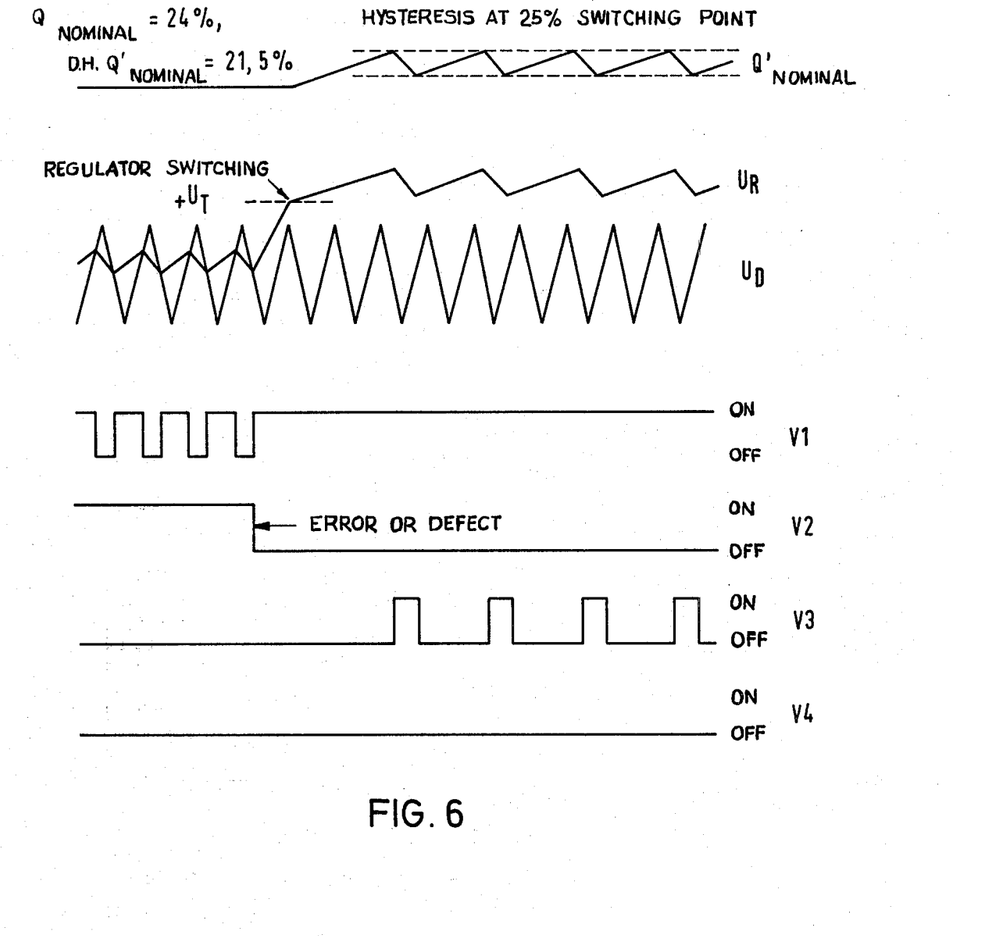
FIG. 6 shows valve positions and regulator variations in the case of emergency operation.

The emergency operation shall be explained with the aid of FIG. 6 wherein the same flows through the valve and a nominal value of 24% are assumed. During normal operation, the regulator voltage $U_R$ is within the amplitude range of the auxiliary delta voltage $U_D$. However, when, for example, the base load valve V2 drops out as a result of a defect or error, the regulator will attempt to further modulate the pulse duration-modulation in order to compensate the loss by means of the timed valve. However, if this cannot be done because the maximum flow through the timed valve is not sufficient, $U_R$ leaves the range of $U_D$ and, thus, initiates the emergency operation.

As FIG. 2 shows, $U_R$ is additionally added to the range indicator input value $Q'_{nominal}$ through a "dead zone" 23. This "dead zone", which, in the simplest case, consists of two opposing Zener or breakdown diodes, is characterized in that it delivers the output signal 0 for input values within the threshold voltage $\pm U_T$, but lets pass the input value reduced by this threshold voltage for values outside of $\pm U_T$. $U_T$ is chosen somewhat larger than the amplitude of the auxiliary delta voltage $U_D$, so that it is ensured that, during normal operation, the regulator signal is uncoupled from the range indicator.

The regulator voltage $U_R$ reduced by the threshold voltage $U_T$ increases $Q'_{nominal}$ until the next switching point of the range indicator is reached. Thus, an additional base load portion is added. In the example according to FIG. 6, the total flow is now larger than the nominal value $Q_{nominal}$ and, thus, the regulator voltage is reversed. However, since a hysteresis is provided at the range indicator, the additional base load remains switched on until $Q'_{nominal}$ has reached the lower hysteresis.

Accordingly, a free oscillation about the range indicator switching point develops. The frequency depends on the switching hysteresis, the regulator speed and the modulation required for reaching the desired nominal value. The frequency is at a maximum in the case of mean modulation and is reduced in the case of smaller and larger modulation.

The minimum pulse widths must be limited to ensure that the inertia of the base load valves does not endanger the linearity of the dosing. Since the hysteresis of the range indicator should not be chosen too large, so that otherwise the maximum flow Q1 of the timed valve and, thus, also the non-linear dosing range must be made larger accordingly during normal operation, a switching of the integrating speed of the regulator is provided. As soon as the comparator 24 of FIG. 2 which observes the output signal of the "dead zone" 23 determines a deviation from the 0-level, it gives a signal "emergency operation" to the central engine control and reduces the integrating speed of the regulator 12 through a changeover switch 25, so that a sufficiently large minimum pulse width results.

Accordingly, with this emergency system, which only requires very little addition of electronic features, it is possible to replace the flow portion of valves which have erroneously dropped out or picked up by timing the remaining valves. Depending on the range indicator switching point, one or several base load valves are timed, while the timed valve itself is permanently switched on or switched off.

The waviness of the fuel flow is larger than in the normal operation, since larger partial amounts must be switched with lower frequency, but the average per time still corresponds to the nominal value $Q_{nominal}$. However, the dosing range becomes narrower due to the failure of valves, i.e., when valves have erroneously dropped out, the corresponding upper dosing range can no longer be adjusted, and when the valves have erroneously picked up the corresponding lower dosing range can no longer be adjusted. In this case, the regulator 12 runs toward its positive or negative maximum value. From this, a comparator 26 derives an error signal for the central engine control so that suitable counter measures can be undertaken.

The system described starts from an analog nominal value $Q_{nominal}$. However, when the central engine control is a digital nominal value, either a commercially available digital-to-analog converter must be interposed or the described control method must be realized by means of a microprocessor. A digital-to-analog converter which may be used in this application is Burr-Brown DAC 80. Starting from the nominal value and the stored calibration values of the individual valves, the microprocessor computes the control signals, performs the comparison with the valve answer signals and, in the case of a defect or error, switches to an emergency program. A microprocessor such as Intel 8080 may be used in this application.

When a microprocessor is used, without any significant additional expenditure, more complex algorithms can be realized for the emergency operation; for example, low clock frequencies can be prevented so that, when a valve fails, a base flow valve is timed with a fixed modulation of 50% or 25% and, additionally, the pulse valve is timed.

The invention can be advantageously employed in all those cases where a continuous dosing with inherent redundancies over a large dosing range is desired or demanded.

These advantages of the system described above, to which particularly the fact must be added that no mechanical or hydraulic answer signal is required, make the invention especially important for dosing the fuel of gas turbine engines. In such application, preferably an electronic regulator derives, from a nominal value obtained from a higher ranking engine control, the control signals for the valves. The valves are preferably constructed as solenoid valves. It is advantageous in this regard when the pressure difference above the fuel solenoid is held constant preferably by means of a pressure regulator.

As further indicated above, the cross section of dosing of the base load valves are binary graded, i.e., the rates of flow of the base load valves correspond to a binary series, whereby an optimum is achieved for the switching off and switching on of individual valves. Accordingly, with as small a number of valves as possible, a base amount range as large as possible can be obtained.

The invention, therefore, requires only an analog valve, i.e., a continuously acting valve, for a certain partial flow, while the residual flow is delivered through the digital base load valves. As a result, fine adjustments become possible which would otherwise require a number of digital valves which could not be realized in practice.

The timed valve as described above is controlled in a pulse duration-modulated manner, i.e., when the clock frequency is constant, the flow can be adjusted by changing the duration of the "on"-state, wherein the clock frequency is chosen in such a way that the time constant of the gas turbine engine smooths the summation flow to the desired extent. In this manner, a continuous adjustment of the average per unit time of the flow is possible. If the differential pressure above the valve is kept constant—as is preferably done—and the valve is quick enough to follow the control pulses, there is a linear relationship between the average per time of the flow and the average per time of the control pulse. Thus, in this analog dosing method, a mechanical or hydraulic answer signal is not required.

Since the speed with which the valve is able to follow the control pulses is not indefinite, the full range of modulation of the pulse duration-modulated valve is not utilized. In other words, the edges of the pulse duration-modulation, i.e., the range of the pulse durations which are very short or where there is no pulse, are avoided so that the advantage of linearity is maintained.

The invention provides an emergency system in a very simple manner and without additional measures, i.e., the proposed control is inherently safe if, according to another feature of the invention, the state of switching of each valve is observed and, in the case of a defect or error, the base load valves are also controlled in a timed manner. In this case, the total flow will have an increased waviness since the base load valves switch larger amounts and since these valves have longer time delays. In addition, due to the failure of a valve, the dosing range becomes narrower accordingly. However, these disadvantages are very small compared to the enormous advantage of the emergency switching or control which can be obtained extremely easily.

While the foregoing description and drawings represent the preferred embodiments of the present invention, it will be obvious to those skilled in the art that various changes and modifications may be made therein without departing from the true spirit and scope of the present invention.

What is claimed is:

1. A flow control system for the control of a plurality of parallel-connected on/off valves comprising:
    a plurality of base control on/off valves connected in parallel between the input and output lines of a flowing medium, said valves subject to on/off control by an electrical signal;
    means for providing control signals for controlling said base control valves, said means responsive to a nominal input control signal;
    a timed valve subject to control by a pulse-width modulated signal, said valve connected parallel to the base control valves between said input and output lines;
    means for providing signals which are analogs of the values of flow through each of the valves;
    summing means for combining said flow-analogous signals to form a signal representing the actual flow through the output line;
    means for comparing the actual flow signal with said nominal input control signal to form an error signal; and
    means responsive to said error signal for pulse-width modulating said timed valve.

2. The system of claim 1 wherein said valves are solenoid valves.

3. The system of claim 2 including a plurality of switches for switching the flow-analogous signals, said switches controlled by answer signals developed by current flow through said solenoid valves.

4. The system of claim 1 wherein said means for providing control signals for controlling said base control valves is an A/D converter, said converter providing a plurality of digital control signals for controlling said base control valves in a binary-coded manner.

5. The system of claim 4 including means for compensating switching hysteresis in said A/D converter and the tolerances in the calibration of the other valves and wherein the maximum flow of said pulse width-modulated valve is selected so that the amount of compensation of said compensating means and the smallest base flow amount is within the linear range of said pulse-width modulated valve.

6. The system of claim 4 including means for providing emergency operation when one or several valves fail by timing said base control valves which are still effective.

7. The system of claim 6 wherein said pulse-width modulating means includes an integrating regulator and means for providing a "dead zone" which is responsive to the output of the integrating regulator and coupled to the A/D converter input, said "dead zone" means uncoupling the regulator during normal operation but permitting coupling to said A/D converter input during emergency operation to effect a free oscillation about one of the switching points of said converter.

8. The system of claim 7 including means to reduce the integrating speed of said regulator during emergency operation so that a sufficiently large minimum pulse width results for adjusting free oscillations.

9. The system of claim 1 including means for maintaining constant the pressure difference above said valves.

10. The system of claim 1 wherein said pulse-width modulating means includes an integrating regulator.

11. The system of claim 10 wherein said pulse-width modulating means includes a clock frequency generator and a comparator responsive to said clock frequency generator and said integrating regulator.

12. The system of claim 1 including means for eliminating those modulation ranges of the pulse-width modulated valve in which there is a lack of linearity between the flow and the average of the control pulse per unit time.

13. A system in accordance with claim 1 including a plurality of switches for switching the flow-analogous signals, said switches controlled by valve answer signals provided by hydraulic means.

14. A system according to claim 1 including a tracer for use with each valve to determine whether or not there is flow through the valve.

* * * * *